C. SCHAMBRA.
Strainers for Milk-Pails.

No. 151,058.　　　　　　　　　　　　　　Patented May 19, 1874.

WITNESSES:

INVENTOR:
C. Schambra
BY
ATTORNEYS.

UNITED STATES PATENT OFFICE.

CONRAD SCHAMBRA, OF WHEELING, WEST VIRGINIA.

IMPROVEMENT IN STRAINERS FOR MILK-PAILS.

Specification forming part of Letters Patent No. 151,058, dated May 19, 1874; application filed March 28, 1874.

*To all whom it may concern:*

Be it known that I, CONRAD SCHAMBRA, of Wheeling, Ohio county, West Virginia, have invented a new and Improved Strainer Attachment for Milk-Pails, of which the following is a specification:

My invention consists of a strainer attachment to milk cans or pails, adapted to serve in combination with a small cap for the cover for the pail, and also adapted for the attachment of a funnel for straining and discharging the milk into a stone jug, or a pail or other vessel having a small neck.

Figure 1:
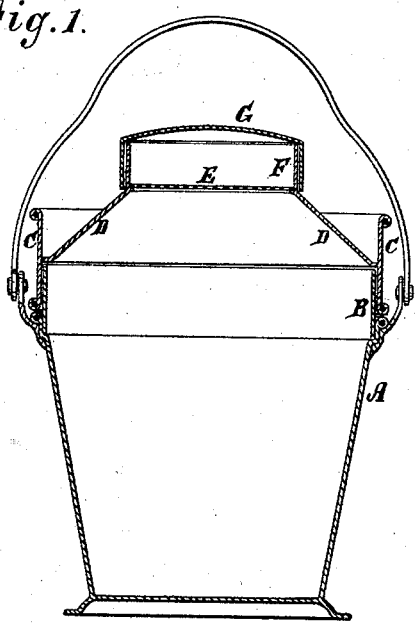
Figure 2:
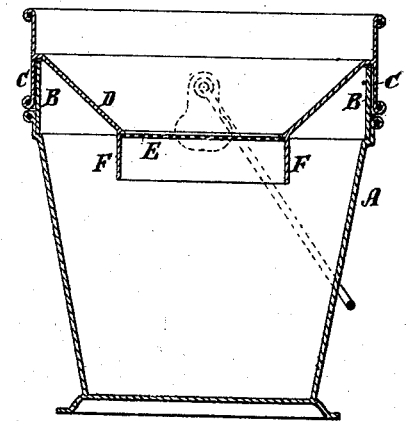
Figure 3:
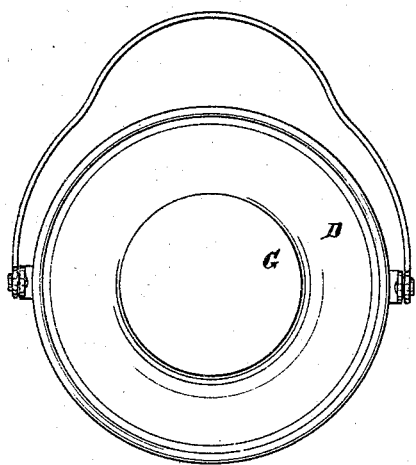
Figure 4:
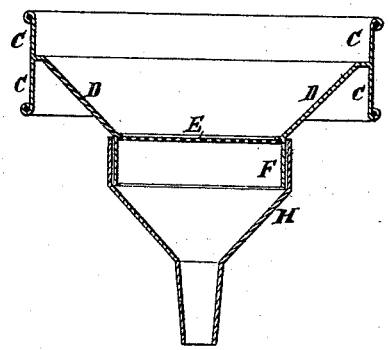

Figure 1 is a sectional elevation of the strainer attachment and its cap arranged for the cover of a pail. Fig. 2 is a sectional elevation, showing the strainer arranged for straining the milk into a pail. Fig. 3 is a plan view of Fig. 1; and Fig. 4 is a section of the strainer, with the funnel applied for straining the milk into a jug.

Similar letters of reference indicate corresponding parts.

A is a can or pail of any approved kind, with a cylindrical band or hoop at the top to receive the band C of the strainer, which consists of a conical hoop, D, wire-gauze strainer E, and the cylindrical hoop F, the conical hoop being connected to the middle of the hoop C on its inside, so that said hoop C can be fitted on the top B either end up. G is a cap fitting on the hoop E when the strainer is to be used for a cover. H is a funnel fitting on said hoop F when the milk is to be strained into a jug or other like vessel.

When the milk is to be strained into the pail the strainer is placed on the pail, as represented in Fig. 2, the cap G being removed. When it is to be used as a cover it is inverted, as in Fig. 1, and the cap G is put on at hoop F at the top, as in Fig. 1.

When the funnel is to be used the strainer is removed from the pail and the funnel attached to the hoop F, as in Fig. 4, to be put in the nozzle of the jug or other narrow-mouthed receptacle.

With this construction the milk can be strained at the same time that it is milked into the pail or any other vessel, and when the pail is filled the cover is ready at hand for covering it.

Having thus described my invention, I claim as new and desire to secure by Letters Patent—

A milk-pail attachment consisting of the hoop C, cone D, strainer E, and hoop F, all constructed, shaped, and respectively arranged as described, to adapt the said attachment to be used in the manner specified.

CONRAD SCHAMBRA.

Witnesses:
LEE C. REED,
J. G. GILLESPY.